US010666189B2

(12) United States Patent
Greer et al.

(10) Patent No.: US 10,666,189 B2
(45) Date of Patent: May 26, 2020

(54) SET OF WINDOW ASSEMBLIES AND A METHOD OF FABRICATING THE SAME

(71) Applicant: SAGE ELECTROCHROMICS, INC., Faribault, MN (US)

(72) Inventors: Bryan D. Greer, Northfield, MN (US); Mark O. Snyker, Apple Valley, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 7 days.

(21) Appl. No.: 14/986,888

(22) Filed: Jan. 4, 2016

(65) Prior Publication Data

US 2016/0197220 A1 Jul. 7, 2016

Related U.S. Application Data

(60) Provisional application No. 62/100,326, filed on Jan. 6, 2015.

(51) Int. Cl.
 *E06B 1/36* (2006.01)
 *E06B 9/24* (2006.01)
 (Continued)

(52) U.S. Cl.
 CPC ............... *H02S 40/38* (2014.12); *E06B 1/36* (2013.01); *E06B 1/702* (2013.01); *E06B 3/04* (2013.01);
 (Continued)

(58) Field of Classification Search
 CPC ...... H01L 31/0468; F21V 33/006; E06B 9/24; E06B 1/00; E06B 1/702; E06B 3/04; E06B 1/36; E06B 7/28; H02S 20/22
 (Continued)

(56) References Cited

U.S. PATENT DOCUMENTS

| 4,294,038 A | 10/1981 | Davidson |
| 5,063,717 A * | 11/1991 | Quaranta ................ E06B 1/363 |
| | | 52/201 |

(Continued)

FOREIGN PATENT DOCUMENTS

| DE | 202010014775 U1 | 3/2011 |
| EP | 0328049 B1 | 10/1991 |

(Continued)

OTHER PUBLICATIONS

International Search Report and Written Opinion for PCT Application No. PCT/US2016/012025, dated Mar. 24, 2016, 15 pages.

(Continued)

*Primary Examiner* — Niki Bakhtiari
(74) *Attorney, Agent, or Firm* — Abel Schillinger, LLP; Robert N Young

(57) ABSTRACT

Different window assemblies can be fabricated and installed where the size of an electrical component is sized for a particular geometry of the window assembly. In a particular embodiment, an energy rating, which may include an energy consumption rate, a recharge rate, a recharge capacity, an electrical current leakage rate, another suitable parameter, or any combination thereof, may be used when determining the size of the electrical component to be used. If needed or desired, one or more trim panels can be used to cover portions of a window assembly to make the window more aesthetically pleasing.

20 Claims, 6 Drawing Sheets

(51) Int. Cl.
*H02S 40/38* (2014.01)
*E06B 3/04* (2006.01)
*E06B 5/00* (2006.01)
*E06B 7/28* (2006.01)
*E06B 1/70* (2006.01)
*H02S 20/22* (2014.01)
*H02S 30/10* (2014.01)

(52) U.S. Cl.
CPC .................. *E06B 5/00* (2013.01); *E06B 7/28* (2013.01); *E06B 9/24* (2013.01); *H02S 20/22* (2014.12); *H02S 30/10* (2014.12); *E06B 2009/2464* (2013.01); *E06B 2009/2476* (2013.01); *Y02B 10/10* (2013.01)

(58) Field of Classification Search
USPC .................................................. 136/243–265
See application file for complete search history.

(56) References Cited

U.S. PATENT DOCUMENTS

| | | | |
|---|---|---|---|
| 5,384,653 A | 1/1995 | Benson et al. | |
| 6,055,089 A * | 4/2000 | Schulz | G02F 1/163 |
| | | | 136/251 |
| 6,297,900 B1 | 10/2001 | Tulloch et al. | |
| 6,406,090 B1 | 6/2002 | Tolinski et al. | |
| 7,372,610 B2 | 5/2008 | Burdis et al. | |
| 8,482,837 B2 | 7/2013 | Sbar et al. | |
| 8,482,838 B2 | 7/2013 | Sbar et al. | |
| 9,250,494 B2 | 2/2016 | Podbelski et al. | |
| 2003/0098056 A1* | 5/2003 | Fronek | E06B 7/28 |
| | | | 136/244 |
| 2004/0061819 A1 | 4/2004 | Faris et al. | |
| 2008/0169185 A1 | 7/2008 | Burdis et al. | |
| 2010/0006865 A1 | 1/2010 | Nakata | |
| 2011/0148218 A1 | 6/2011 | Rozbicki | |
| 2011/0180122 A1* | 7/2011 | Tanner | H01L 31/022425 |
| | | | 136/244 |
| 2012/0194895 A1 | 8/2012 | Podbelski et al. | |
| 2013/0025673 A1 | 1/2013 | Huebel et al. | |
| 2013/0063802 A1 | 3/2013 | Varaprasad et al. | |
| 2013/0247954 A1 | 9/2013 | Kunz | |
| 2014/0003038 A1 | 1/2014 | Kim et al. | |
| 2014/0083028 A1 | 3/2014 | Richardson | |
| 2015/0378231 A1 | 12/2015 | Greer et al. | |

FOREIGN PATENT DOCUMENTS

| | | |
|---|---|---|
| JP | S6073990 A | 4/1985 |
| JP | S60124717 U | 8/1985 |
| JP | S60148983 A | 8/1985 |
| JP | S60253688 A | 12/1985 |
| JP | S62115416 A | 5/1987 |
| JP | S63116830 U | 7/1988 |
| JP | H01059226 U | 4/1989 |
| JP | H08184273 A | 7/1996 |
| JP | H10227102 A | 8/1998 |
| JP | 2002148573 A | 5/2002 |
| JP | 2002221581 A | 8/2002 |
| JP | 2004012818 A | 1/2004 |
| JP | 2014505905 A | 3/2014 |
| WO | 2011108334 A1 | 9/2011 |
| WO | 2013109881 A2 | 7/2013 |
| WO | 2014032023 A2 | 2/2014 |
| WO | 2015200093 A1 | 12/2015 |
| WO | 2016111917 A1 | 7/2016 |

OTHER PUBLICATIONS

International Search Report and Written Opinion for PCT/US2015/036458, dated Sep. 11, 2015, 12 pages.

* cited by examiner

SET OF WINDOW ASSEMBLIES AND A METHOD OF FABRICATING THE SAME

CROSS-REFERENCE TO RELATED APPLICATIONS

The present application claims priority under 35 U.S.C. § 119(e) to U.S. Provisional Patent Application No. 62/100,326, filed Jan. 6, 2015, entitled "SET OF WINDOW ASSEMBLIES AND A METHOD OF FABRICATING THE SAME," naming as inventors Bryan D. Greer et al., which application is assigned to the current assignee hereof and is incorporated by reference herein in its entirety.

FIELD OF THE DISCLOSURE

The present disclosure is directed to window assemblies and methods of fabricating the same.

BACKGROUND

Window assemblies can include electrochromic materials that can change their optical properties in response to the application of an electrical potential. Such a change can make glazings within the assemblies more or less transparent or more or less reflective. The window assemblies may be coupled to one or more electrical components and installation can be complicated due to the associated electrical components. Improvements with fabrication techniques are desired.

BRIEF DESCRIPTION OF THE DRAWINGS

Embodiments are illustrated by way of example and are not limited in the accompanying figures.

Figure 1:
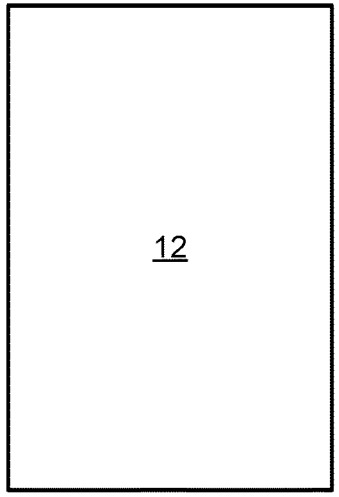
FIG. 1 includes an illustration of three different glass units having the same length and different widths.
Figure 1:
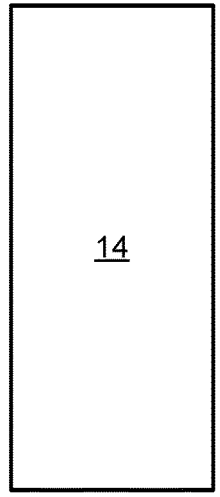
Figure 1:
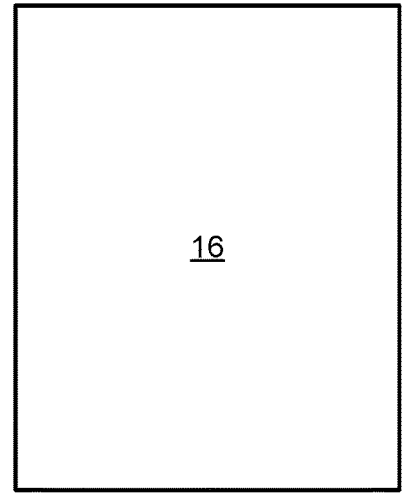

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Dimensions of components for window assemblies, just like many other construction materials, may be specified in nominal dimensions, as opposed to actual dimensions. Even if the same exact dimension is intended, some deviation due to manufacturing tolerances is expected. As used herein and when referring to the same value of a dimension (for example, length, width, and thickness), two different articles have the same value of the dimension when the difference in the dimension between the two different articles divided by the larger dimension is no greater than 0.15 (dimensions are within 10% of each other). In a particular embodiment, the difference in the dimension between the two different articles divided by the larger dimension is no greater than 0.05 (dimensions are within 5% of each other).

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the electrochromic and dynamic glass arts.

Different components for window assemblies can come in a variety of sizes, and number of sizes for the components can be different. For example, glass units may have N1 number of lengths and N2 number of widths, solar panels can have N3 number of lengths and N4 number of widths, energy storage units can have N5 number of lengths and N6 number of widths, and so forth. N1 to N6 can be any finite whole number. In an embodiment, at least two of N1 to N6 may be different numbers. In a particular embodiment each of N1 to N6 is a different number, and in another, at least two of N1 to N6 are the same number. A number representing union of lengths and widths for the glass units can be many factors higher than the number of different sizes of electrical components, such as solar panels or energy storage units. For example, the glass units can have many different sizes that reflect 50 or more possible lengths and widths, and any particular electrical component may have less than 20 different sizes, less than 15 sizes, less than 10 sizes, or even fewer sizes.

Figure 2:
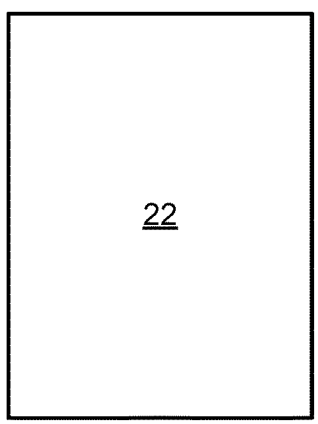
FIG. 2 includes illustrations of three different glass units having different lengths and the same width.
Figure 2:
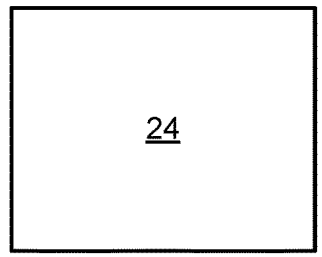
Figure 2:
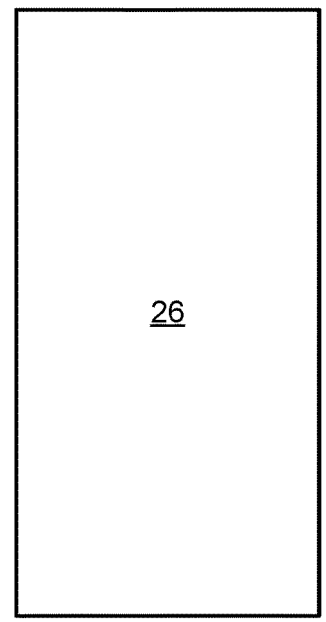
Figure 3:
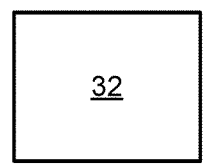
FIG. 3 includes an illustration of a solar unit.
Figure 4:
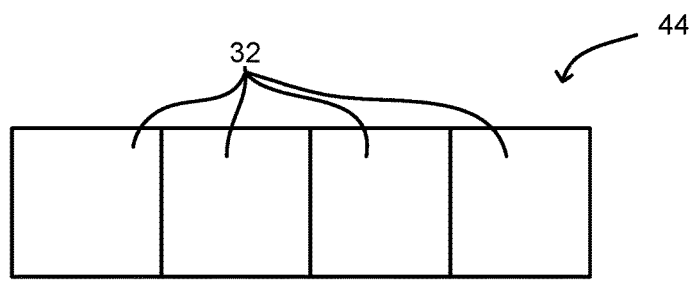
FIG. 4 includes an illustration of a solar module that includes solar units.
Figure 5:
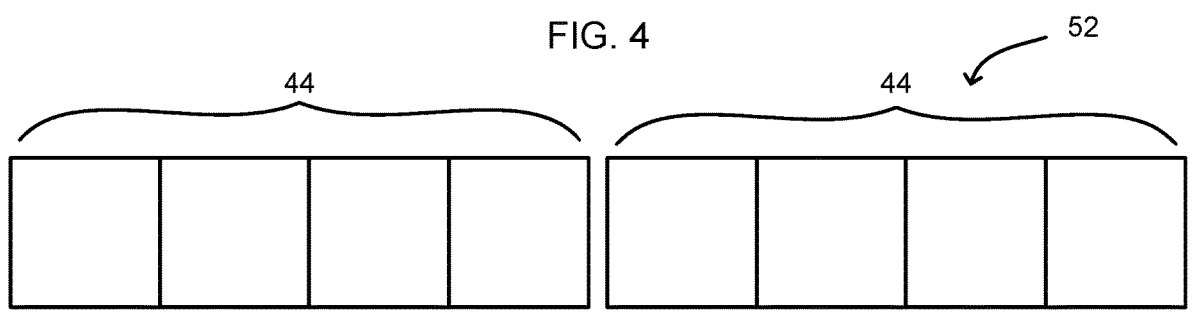
FIG. 5 includes an illustration of a solar panel that includes solar modules.
Figure 6:
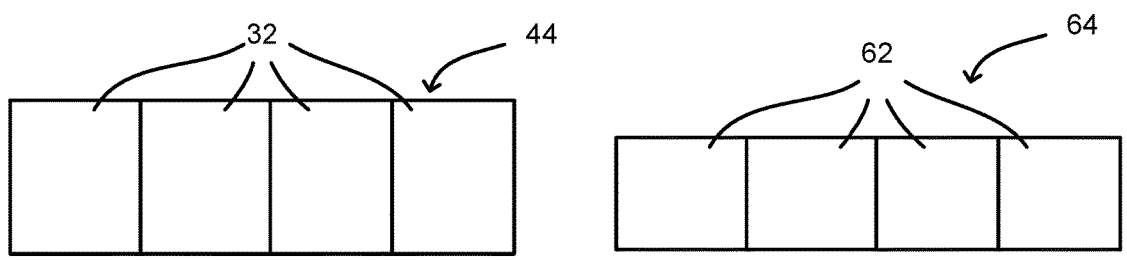
FIG. 6 includes illustrations of solar modules that include solar units having different widths.
Figure 7:
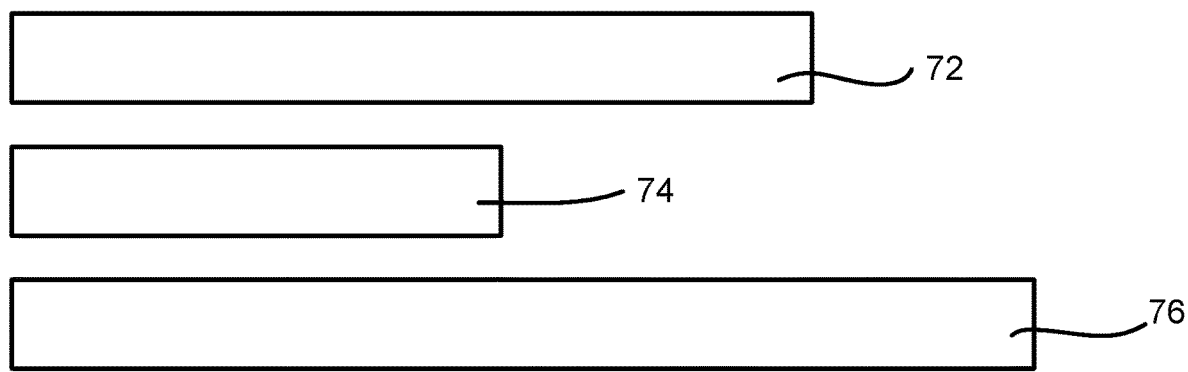
FIG. 7 includes illustrations of three different energy storage units having different lengths and the same width.
Figure 8:
FIG. 8 includes illustrations of two different energy storage units having the same length and different widths.

FIGS. 1 to 8 illustrate some of the variations for glass units, solar panels, and energy storage units. FIGS. 1 and 2 include illustrations of six different glass units. Glass units 12, 14, and 16 have the same length and different widths, and glass units 22, 24, and 26 have different lengths and the same width. FIG. 3 illustrates a single solar unit 32 for a solar panel. In an embodiment, a solar panel include just one solar unit, and in another embodiment, a solar panel can be a single solar module 44 with four solar units 32. In a further embodiment, a solar panel 52 can include two solar modules 44, each with four solar units 32. Referring to FIGS. 3 to 5, the solar units 32 may have the same width, and the energy rating of the solar panel can be determined by the length (number of solar units) of the solar panel. In yet another embodiment as illustrated in FIG. 6, a solar panel that includes the solar module 44 and solar units 32 may have a width that is different from another solar panel that includes a solar module 64 and solar units 62. An energy storage unit can be a battery, a capacitor, another suitable device capable of retaining a charge, or any combination thereof. FIGS. 7 and 8 include illustrations of five different batteries, which are a specific type of energy storage unit. Batteries 72, 74, and 76 have different lengths and the same width, and batteries 72 and 82 have the same length and different widths. The batteries may have a circular shape when view from the end, and thus, a diameter is a specific type of width. After reading this specification, skilled artisans will appreciate that the illustrated glass units, solar panels, and batteries are merely representative of the many different sizes of components of window assemblies that can be used.

Figure 9:
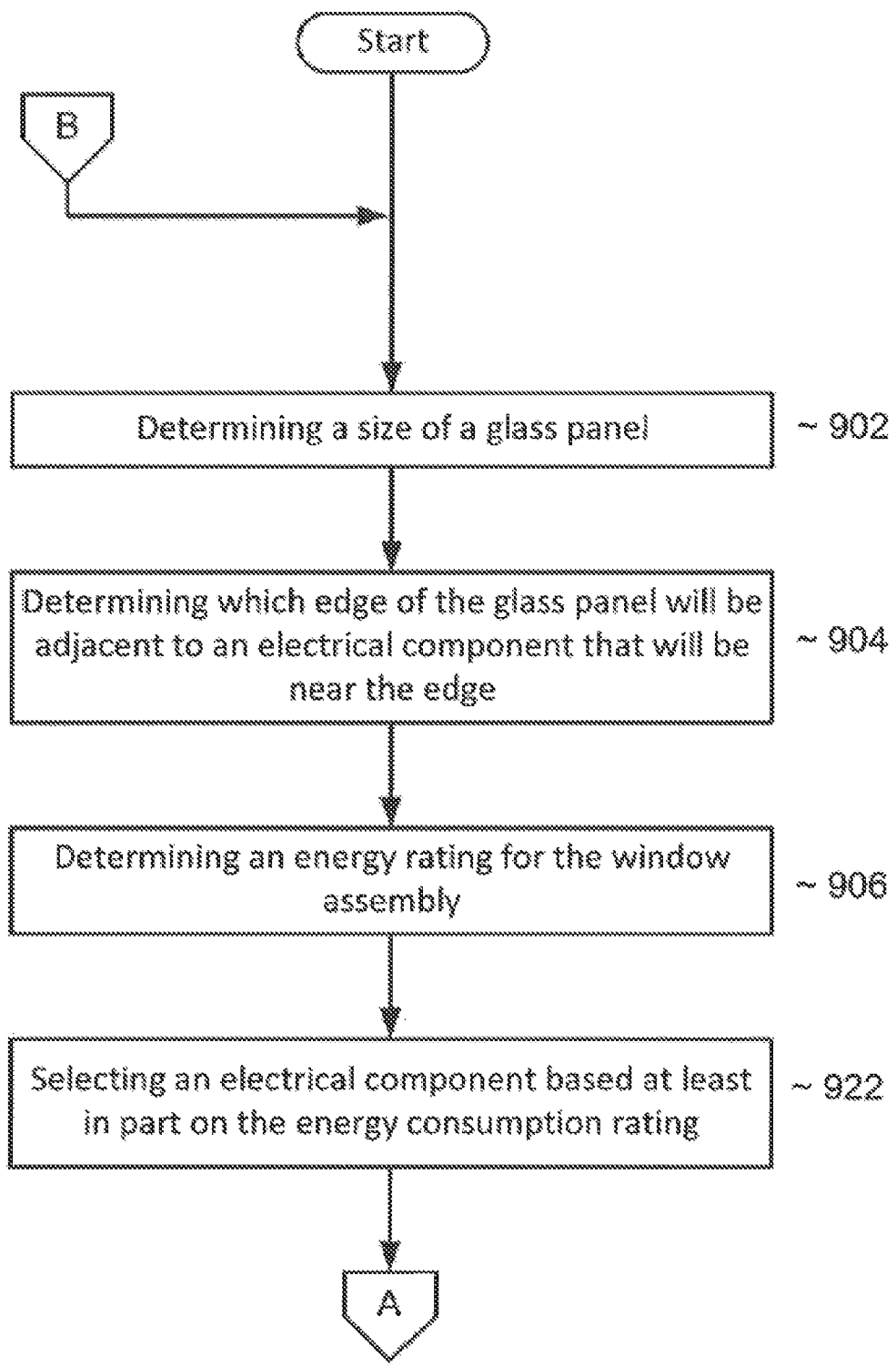
FIGS. 9 and 10 include a process flow diagram of a method of fabricating and installing window assemblies.
Figure 10:
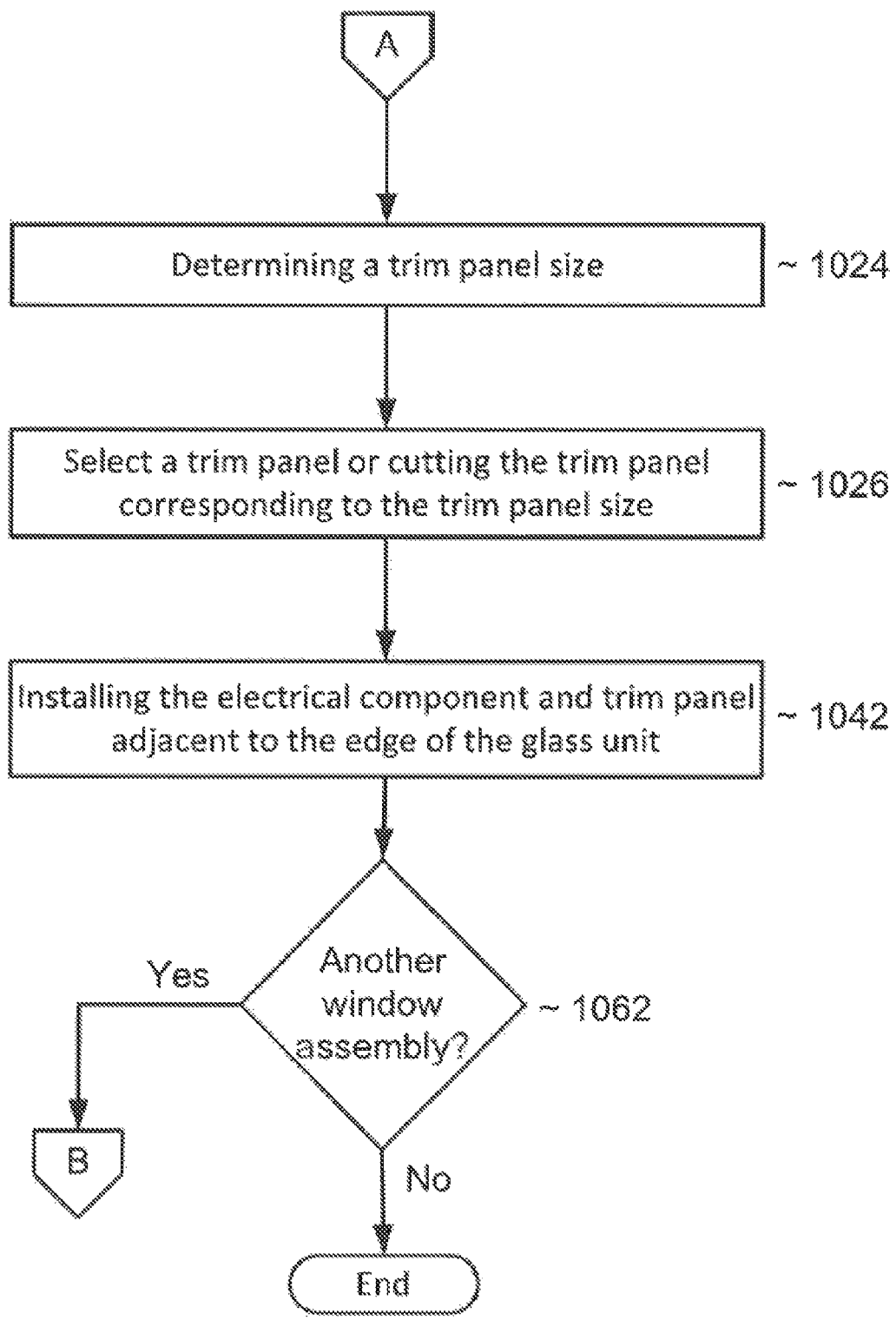

A limited number of sizes of the components may help to reduce the likelihood of selecting the wrong size of components and simplify manufacturing. Additionally, components do not need to be custom made for each window assembly. FIGS. 9 and 10 include a process flow diagram for an exemplary method that can be used in fabricating and installing a set of window assemblies. The method is well suited where the number of variables for the different components is different.

The method can include determining a size of a glass unit, at block 902 in FIG. 9. The size will depend on a designed size of a window or an actual size of an existing window. The glass unit may come in wide variety of different sizes. In a particular embodiment, the length can be at least 11 cm, at least 15 cm, at least 20 cm, or at least 25 cm, and in another embodiment, the length may be no greater than 200 cm, no greater than 180 cm, or no greater than 160 cm, or no greater than 140 cm. In a particular embodiment, the length is in a range of 11 cm to 200 cm, 15 cm to 180 cm, 20 cm to 160 cm, or 25 cm to 140 cm. The width can have any of the values as previously listed for the length, and the width may be the same or different from the length. In another embodiment, the length or the width may have a value less than or greater than those listed. The number of different values for the lengths and widths may be large, such as at least 50, 80, or 110. The number of different values may be no greater than 900, no greater than 800, or no greater than 700. In an alternative embodiment, the number of different values may be smaller or larger than those disclosed, or may have a value between any of the numbers recited.

The method can further include determining which edge of the glass panel will be adjacent to an electrical component that will be near the edge, at block 904. The location of the electrical component may depend on what part of a building the window assembly will be installed. For a vertically oriented window (major faces of the glass unit are to be perpendicular to the ground elevation), the electrical component can be installed along the edge that will be at the lowest elevation. Thus, the edge will be along a bottom of the glass unit. For a skylight (major faces of the glass unit are not perpendicular to the ground elevation), the electrical component can be installed along the edge that will be at the span from a higher elevation to a lower elevation to allow water to drain more readily from the window. Thus, the edge will be along a side of the glass unit. The edge will have a corresponding dimension that represents a viewable distance along the edge. For example, a glass unit has an edge that extends 60 cm, and, of that 60 cm edge, 1 cm of each end of that distance will be covered by a frame. The relevant dimension for the glass unit is 58 cm (60 cm (length of edge) minus 2×1 cm (1 cm of each end will be covered by the frame)). Particular locations of electrical components with respect to window assemblies and frames are illustrated and described in US 2012/0194895, which is incorporated herein by reference in its entirety.

The method can still further include determining an energy rating for the window assembly, at block 906. The energy rating can be an energy consumption rate, a recharge rate or recharge capacity, an energy leakage rate, another suitable energy parameter regarding the window assembly, or any combination thereof.

In an embodiment, the energy rating can depend at least in part on energy consumption. In an embodiment, the glass unit can be an insulated glass unit (IGU). The glass unit can include glazings that are spaced apart from one another. Each of the glazings can include a glass, such as soda lime glass, borosilicate glass, float glass, or the like), or can include another transparent material, such as sapphire, spinel, aluminum oxide (AlON), or the like. Each glazing can be a single sheet of transparent material or a laminate. An electrochromic (EC) device can be located on a surface of one of the glazings or on a substrate that is attached to a counter substrate, which may be one of the glazings. In an embodiment, the EC device is between glazings of an IGU. The EC device can have its optical properties change in response to a change in of an electrical potential. Such a change can, make the IGU more or less transparent or more or less reflective. An EC device can include a counter electrode layer, an electrochromic layer, and an ionically conductive layer separating the counter electrode layer and the electrochromic layer. The EC device can further include two transparent conductive layers are substantially parallel to and in electrically coupled to the counter electrode layer and the electrochromic layer.

Exemplary materials for the counter electrode layer, the electrochromic material layer, the ionically conductive layer and the conductive layers are described in United States Patent Publication No. 2008/0169185, which is incorporated herein by reference in its entirety. Such materials can be substantially transparent oxides or nitrides. When an electrical potential is applied across the layered structure of the EC device, such as by connecting the respective conductive layers to a low voltage electrical source, ions, such as $Li^+$ ions in the counter electrode layer, flow from the counter electrode layer, through the ion conductor layer, and to the electrochromic layer. In addition, electrons flow from the counter electrode layer, through an external circuit to the electrochromic layer so as to maintain charge neutrality in the counter electrode layer and the electrochromic layer. The transfer of ions and electrons to the electrochromic layer causes the optical characteristics of the electrochromic layer, and optionally the counter electrode layer in a complementary EC device, to change. In a particular embodiment, the EC device changes color, the transparency, or both the color and transparency of the EC device.

The energy consumption rate of the glass unit can depend on the particular electrochemical system configuration, which can include the materials, construction, and area occupied by the electrochemical system. For the same materials and construction, different glass units will have an energy consumption rates that will be, to at least a first order, proportionate to the area of the electrochemical system. The energy consumption rate may be based on hours of sunlight, hours of nighttime (no sunlight regardless of cloud conditions), number of cloudy days, level of cloudiness (thin high cirrus, thick cumulonimbus, etc.). Thus, data for determining energy consumption rate may be reviewed over nearly any period of time, from a few minutes to one year or many years. The energy consumption rate may be based on the highest expected hourly energy consumption rate, a $90^{th}$ percentile value, an average value during sunlight hours, an average over a variety of conditions, or the like. The energy consumption rate may be increased by a fixed amount, for example 10%, to allow for a safety or degradation factor. Skilled artisans will appreciate that other techniques can be used to determine the energy consumption rate.

In another embodiment, the energy rating can depend at least in part on a recharge rate, a recharge capacity or a leakage rate. The window assembly can include an energy storage unit, such as a battery or a capacitor. The battery may have a limited rate at which is can be recharged. Thus, the recharge rate may be limited on how quickly the battery may be safely recharged. The energy storage unit can also have a recharge capacity, which can be the difference between a fully charged state and a drained state, which can be represented by the lowest voltage or current below which the battery or other electrical components associated with the window assembly should not be operated. Many electrical circuits and energy storage devices can have leakage current even when components are in an off state. When in an off state for a long period of time, the energy lost due to leakage current can be significant. The recharge rate, recharge capacity, leakage rate or any combination there may be increased by a fixed amount, for example 10%, to allow for a safety or degradation factor. Skilled artisans will appreciate that other techniques can be used to determine the energy consumption rate.

The method can include selecting an electrical component based at least in part on the energy rating, at block 922. The selection may also depend on the designed operating voltage for the electrical components for the window assembly. The electrical components may be designed to operate at 1.2 V, 3.3 V, 5 V, 12 V, or the like. For a solar panel, an energy consumption rate of an EC device, a recharge rate of an energy storage unit, or both may be used in determining the energy rating. In a particular embodiment, the relevant energy rating for the window assembly may be 5.9 W. If each solar unit can provide 1.1 W, six solar units would be used, as the number of solar units is rounded up to the next highest whole number. If each solar unit is 14 cm long and 5 cm wide, the solar panel can be 85 cm long and 5 cm wide. In another embodiment, the relevant energy rating is 8.6 W, and eight solar units would be used. Thus, the solar panel can be 112 cm long and 5 cm wide. In a further embodiment, the relevant energy rating is 4.3 W, and eight solar units would be used. Thus, the solar panel can be 56 cm long and 5 cm wide. In another embodiment, the solar panels may have more than one width. For an energy storage unit, a recharge rate, a recharge capacity, a leakage rate, and operation of the EC device or another electrical component may affect the selection of and dimensions of the energy storage unit. The considerations for the selection of the energy storage unit are similar to the considerations previously described with respect to the solar panel.

Figure 11:
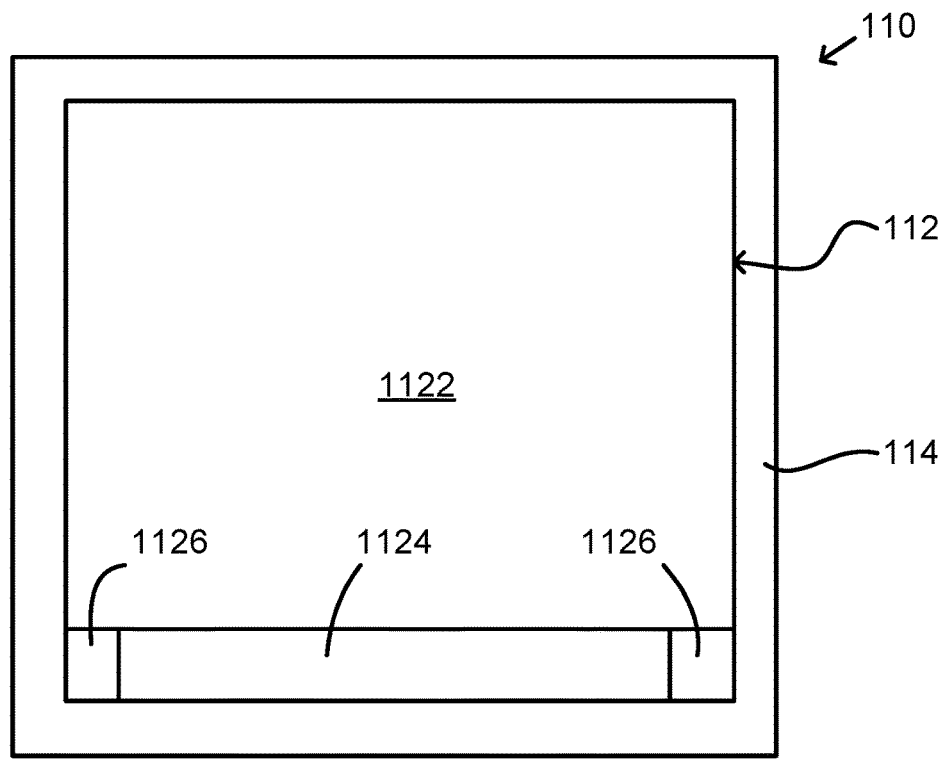
FIG. 11 includes an illustration of a front view of a window that includes a window assembly and frame, for a vertical window application.

The method can further include determining a trim panel size, at block 1024 of FIG. 10. The trim panel can help with the appearance of electrical components associated with the window assembly. Thus, the trim panel is optional, and not required in all embodiments. A mounting assembly can include one or more electrical components, such as a solar panel, an energy storage unit, a control unit, or any combination thereof. The solar panel will have a surface exposed to receive ambient light. The trim panel can cover the other electrical components and mounting hardware. The number and size of the trim panels can depend on the length of the solar panel and remaining distance to the frame. In an embodiment as illustrated in FIG. 11, a window 110 includes a window assembly 112 installed within a frame 114. The window assembly 112 includes a glass unit 1122, a solar panel 1124, and trim panels 1126. The solar panel 1124 is centered along a bottom edge of the frame 114. Trim panels 1126 cover the lateral spaces between the solar panel 1124 and the side edges of the frame 114. In this particular embodiment, the trim panels will have one dimension that is the same as the width of the solar panel 1124. The other dimension of each of the trim panels will be one half of the difference between the length of the inner border of the bottom edge of the frame minus the length of the solar panel 1124, and is represented by the equation below.

$$L_{tp} = \frac{1}{2} * (L_{ibbe} - L_{sp})$$

where:

$L_{tp}$ is the length of each trim panel;

$L_{ibbe}$ is the length of the inner border along the bottom edge of the frame; and $L_{sp}$ is the length of the solar panel.

In another embodiment (not illustrated), end caps can cover the ends of the trim panels between the frame. In this embodiment, the trim panels will be shorter than the amount provided in the prior equation. The trim panels may be 0.1 cm to 2 cm shorter than $L_{tp}$ in the equation above. The shorter length of the trim panel may provide a gap that is useful for expansion and contraction as the temperature changes. The end caps can take up the space used for the gaps so the gaps are not as readily visible when looking at the window.

Figure 12:
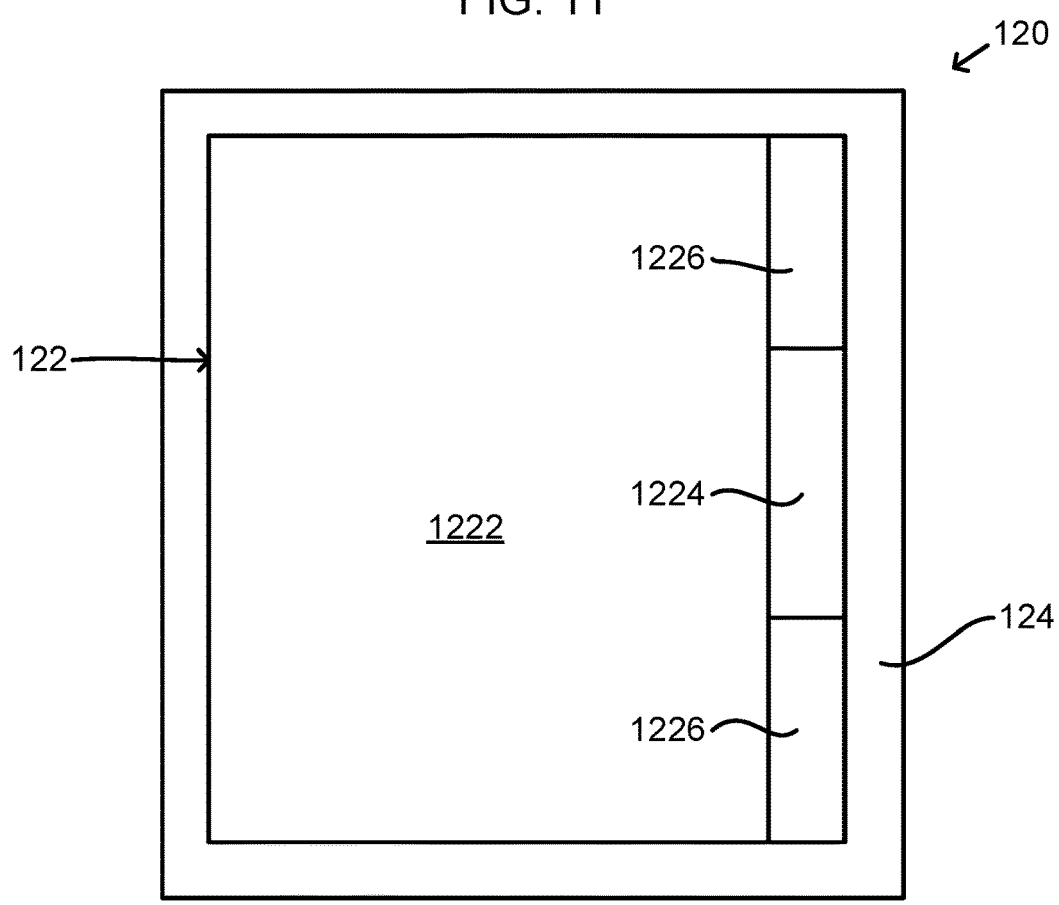
FIG. 12 includes an illustration of a front view of a window that includes a window assembly and frame, for a skylight application.

In an embodiment as illustrated in FIG. 12, a window 120 can be a skylight and include a window assembly 122 installed within a frame 124. The window assembly 122 includes a glass unit 1222, a solar panel 1224, and trim panels 1226. The solar panel 1224 is centered along a side edge of the frame 124. Trim panels 1226 cover the lateral spaces between the solar panel 1224 and the top and bottom edges of the frame 124. In this particular embodiment, the trim panels 1224 will any of the dimensions as previously described with respect the trim panels 1124. The placement of the solar and trim panels along a side can help water drain more readily.

The method can further include selecting a trim panel or cutting the trim panel corresponding to the trim panel size, at block 1026. A variety of sizes of trim panel may be pre-made, and the size of the trim panel can be selected based on the considerations previously described. In another embodiment, a trim panel can be cut from a stock piece of material. In a particular embodiment, the trim panel can include a molded or extruded material. The trim panel can include a metal or a metal alloy, such as copper, aluminum, nickel, brass, bronze, or the like, or may include a polymer, such as a polyvinyl compound, a polyurethane, a polyolefin, or the like. Such polymer may include additives or be coated to achieve a material that can withstand long-term exposure to outdoor conditions. In a particular embodiment, the trim panel can include black anodized aluminum to match more closely the color of the solar panel. The black anodized aluminum may be come in the form of an extruded piece from stock, from which trim panels can be easily cut.

The method includes installing the electrical component and trim panel adjacent to the edge of the glass unit. The electrical component can include any one or more of a solar panel, an energy storage unit, a control unit, and the like. During installation, electrical connections can be made. For example, a control unit can be coupled to one or more of an EC device within the glass unit, a solar panel, an energy storage unit, an environmental control system of building, or any combination thereof. The environmental control system can include the heating, ventilation, and air conditioning (HVAC) system, an interior lighting system, another suitable control system, or any combination thereof. In a particular embodiment, outside light conditions can be determined by the control unit in response to current of a solar panel, a signal from the light sensor, a temperature difference between inside and outside the building, or the like. The control unit can adjust the potential of the EC device to affect transmission of light or solar heat gain coefficient. In another particular embodiment, the control unit can be used to control charging and discharging of the energy storage unit. In still a further embodiment, the control unit may receive state information from the environmental control system or another source and control the EC device accordingly. For example, the control unit may allow a higher transmission, a higher solar heat gain coefficient, or both on a sunny cold day as compared to a sunny hot day. In this particular example, the temperature difference between the ambient inside and outside of the building may be used. In another application, the control unit can provide other functionality as needed or desired. After reading this specification, skilled artisans will understand that the control unit may have its functionality tailored to a particular application as needed or desired. Thus, the functionality described is merely exemplary and does not limit the scope of the appended claims.

The electrical component and trim panel may be installed onto the glass unit or the frame. When installed onto the glass unit, mounting brackets (not illustrated) can be secured to the glass unit, and a mounting assembly including the electrical component and trim panel can be attached to the mounting brackets. The mounting assembly may be mounted before or after the glass unit is installed within the frame. When installed onto the frame, an electrical component, such as a solar panel can be secured to the frame. A trim panel may or may not be used. If the frame is a different color from the exposed surface of the solar panel, for example, the frame is aluminum (silver color when not anodized), a trim panel may be used so that horizontal features of the windows are black, and the vertically oriented frame members are not covered, more consistent with an art deco style. After reading this specification, skilled artisans will be able to configure a design to meet the needs or desires for a particular application.

A determination can be made whether another window assembly is to be fabricated, at diamond 1062. If yes, the method continues starting at block 902 in FIG. 9. Otherwise, the method is completed.

Embodiments described herein have benefits over conventional systems and techniques. A single size of electrical component for a particular dimension may not be the most cost-effective solution for window fabricator, builder, or owner of a building. For example, the electrical component will be the largest that can fit along the dimension. In another attempt to address the issue, each window assembly can have a custom design for every combination of window size and energy rating.

In accordance with the concepts herein, a limited number of different sizes of electrical components may be used for a variety different dimensions for window assemblies may be used. For example, three different window assemblies can have different dimensions, and two window assemblies can have the same size of an electrical component, such as a solar panel or an energy storage unit, and the third window assembly may have a different size electrical component. If needed or desired, trim panels may be used to select or cut as previously described.

Unlike a single size or custom design, the electrical component can be selected from a finite group, so that the electrical component is better matched to energy rating for a particular window size, without the added complexity and expense of custom designs. Thus, a finite number of sizes or fewer of solar panels or energy storage units can be used to select a particular size of electrical component that is best matched to a particular window size and energy rating.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A set of window assemblies comprising:
a first window assembly including:
a first glass unit having a first dimension along a first edge;
a first solar panel adjacent to and extending along the first edge of the first glass unit, wherein the first solar panel has a first length;
a second window assembly including:
a second glass unit having a second dimension along a second edge; and
a second solar panel adjacent to and extending along the second edge of the second glass unit, wherein the second solar panel has a second length,
wherein the first and second dimensions are different from each other, and the first and second lengths are the same.

Embodiment 2

A set of window assemblies comprising:
a first window assembly including:
a first glass unit having a first dimension along a first edge;
a first energy storage unit adjacent to and extending along the first edge of the first glass unit, wherein the first energy storage unit has a first length;
a second window assembly including:
a second glass unit having a second dimension along a second edge; and a second energy storage unit adjacent to and extending along the second edge of the second glass unit, wherein the second energy storage unit has a second length, wherein the first and second dimensions are different from each other, and the first and second lengths are the same.

Embodiment 3

The set of window assemblies of Embodiment 2, wherein:
the first window assembly further includes:
a first solar panel adjacent to and extending along the first edge of the first glass unit, wherein the first solar panel has a first length;
the second window assembly further includes:
a second solar panel adjacent to and extending along the second edge of the second glass unit, wherein the second solar panel has a second length and
the first length of the first solar panel and the second length of the second solar panel are the same.

Embodiment 4

The set of window assemblies of any one of the preceding Embodiments, wherein:
the first window assembly further comprises a first trim panel adjacent to and along the first edge of the first glass unit, wherein the first trim panel has a first length; and
the second window assembly further comprises a second trim panel adjacent to and along the second edge of the second glass unit, wherein the second trim panel has a second length.

Embodiment 5

The set of window assemblies of any one of the preceding Embodiments, wherein:
the first window assembly further comprises a first control unit electrically coupled to the first solar panel or the first energy storage unit.
the second window assembly further comprises a second control unit electrically coupled to the second solar panel or the second energy storage unit.

Embodiment 6

The set of window assemblies of any one of the preceding Embodiments, further comprising a third window assembly including a third glass unit having a third dimension along a third edge.

Embodiment 7

The set of window assemblies of Embodiment 6, wherein the third window assembly further comprises a third solar panel adjacent to and along the third edge of the third glass unit, wherein the third solar panel has a third length.

Embodiment 8

The set of window assemblies of Embodiment 6 or 7, wherein the third window assembly further comprises a third energy storage unit adjacent to and along the third edge of the third glass unit, wherein the third energy storage unit has a third length.

Embodiment 9

The set of window assemblies of any one of Embodiments 6 to 8, wherein the third window assembly further comprises a third trim panel adjacent to and along the third edge of the third glass unit, wherein the third trim panel has a third length.

Embodiment 10

The set of window assemblies of any one of Embodiments 7 to 9, wherein the third window assembly further comprises a third control unit electrically coupled to the third solar panel or the third energy storage unit.

Embodiment 11

A method comprising:
selecting a first solar panel having a first length;
installing the first solar panel adjacent to a first edge of a first glass unit, wherein the first glass unit has a first dimension along a first edge;
selecting a second solar panel having a second length; and
installing the second solar panel adjacent to a second edge of a second glass unit, wherein the second glass unit has a second dimension along a second edge,
wherein the first and second dimensions are different from each other, and the first and second lengths are the same.

Embodiment 12

A method comprising:
selecting a first energy storage unit having a first length;
installing the first energy storage unit adjacent to a first edge of a first glass unit, wherein the first glass unit has a first dimension along a first edge;
selecting a second energy storage unit having a second length; and
installing the second energy storage unit adjacent to a second edge of a second glass unit, wherein the second glass unit has a second dimension along a second edge,
wherein the first and second dimensions are different from each other, and the first and second lengths are the same.

Embodiment 13

The method of Embodiment 12, further comprising:
selecting a first solar panel having a first length;
installing the first solar panel adjacent to the first edge of the first glass unit;
selecting a second solar panel having a second length; and
installing the second solar panel adjacent to the second edge of the second glass unit,
wherein the first length of the first solar panel and the second length of the second solar panel are the same.

Embodiment 14

The method of any one of Embodiments 11 to 13, further comprising:
selecting a first trim panel having a first length;
installing the first trim panel adjacent to the first edge of the first glass unit;
selecting a second trim panel having a second length; and
installing the second trim panel adjacent to the second edge of the second glass unit,
wherein the first length of the first trim panel and the second length of the second trim panel are different from each other.

Embodiment 15

The method of any one of Embodiments 11 to 14, further comprising:

installing a first control unit electrically coupled to the first solar panel, the first energy storage unit, or both; and installing a second control unit electrically coupled to the second solar panel, the second energy storage unit, or both.

Embodiment 16

The method of any one of Embodiments 11 to 15, further comprising:
determining a first energy rating of the first window assembly, wherein selecting the first solar panel or the first energy storage unit depends at least in part on the first energy rating;
determining a second energy rating of the second window assembly, wherein selecting the second solar panel or the second energy storage unit depends at least in part on the second energy rating; or
determining the first energy rating of the first window assembly and the second energy rating of the second window assembly, wherein selecting the first solar panel or the first energy storage unit depends at least in part on the first energy rating, and selecting the second solar panel or the second energy storage unit depends at least in part on the second energy rating.

Embodiment 17

The method of any one of Embodiments 11 to 16, further comprising:
selecting a third solar panel having a third length; and
installing the third solar panel adjacent to a third edge of a third glass unit, wherein the third glass unit has a third dimension along a third edge,
wherein the first, second, and the third dimensions are different from one another, and the third length of the third solar panel and the first length of the first solar panel are different from each other.

Embodiment 18

The method of any one of Embodiments 11 to 17, further comprising:
selecting a third energy storage unit having a third length; and
installing the third energy storage unit adjacent to a third edge of a third glass unit, wherein the third glass unit has a third dimension along a third edge,
wherein the first, second, and the third dimensions are different from one another, and the third length of the third energy storage unit and the first length of the first energy storage unit are different from each other.

Embodiment 19

The method of Embodiment 17 or 18, further comprising:
selecting a third trim panel having a third length; and
installing the third trim panel adjacent to the third edge of the third glass unit.

Embodiment 20

The method of any one of Embodiments 17 to 19, further comprising:
installing a third control unit electrically coupled to the third solar panel, the third energy storage unit, or both.

Embodiment 21

The method of any one of Embodiments 17 to 20, further comprising:

determining a third energy rating of the third glass unit, wherein selecting the third solar panel or the third energy storage unit depends at least in part on the third energy rating.

Embodiment 22

The set of window assemblies or the method of any one of Embodiments 1, 3 to 11, and 13 to 21, wherein the first solar panel has a first width, the second solar panel has a second width, and the first and second widths are the same.

Embodiment 23

The set of window assemblies or the method of any one of Embodiments 1, 3 to 11, and 13 to 21, wherein the first solar panel has a first width, the second solar panel has a second width, and the first and second widths are different from each other.

Embodiment 24

The set of window assemblies or the method of Embodiments 1, 4 to 11, and 14 to 23, wherein the first length of the first energy storage unit and the second length of the second energy storage unit are the same.

Embodiment 25

The set of window assemblies or the method of Embodiments 1, 4 to 11, and 14 to 23, wherein the first length of the first energy storage unit and the second length of the second energy storage unit are different from each other.

Embodiment 26

The set of window assemblies or the method of any one of Embodiments 2 to 10 and 12 to 25, wherein the first energy storage unit has a first width, the second energy storage unit has a second width, and the first width of the first energy storage unit and the second width of the second energy storage unit are the same.

Embodiment 27

The set of window assemblies or the method of any one of Embodiments 2 to 10 and 12 to 25, wherein the first energy storage unit has a first width, the second energy storage unit has a second width, and the first width of the first energy storage unit and the second width of the second energy storage unit are different from each other.

Embodiment 28

The set of window assemblies or the method of any one of Embodiments 4 to 10 and 14 to 27, wherein the first length of the first trim panel is different from the second length of the second trim panel.

Embodiment 29

The set of window assemblies or the method of any one of the preceding Embodiments, wherein the first glass unit is a first insulated glass unit, and the second glass unit is a second insulated glass unit.

Embodiment 30

The set of window assemblies or the method of Embodiment 29, wherein each of the first and second glass units includes an electrochemical system.

Embodiment 31

The set of window assemblies or the method of any one of Embodiments 6 to 10 and 17 to 30, wherein the third glass unit is a third insulated glass unit.

Embodiment 32

The set of window assemblies or the method of Embodiment 31, wherein the third glass unit includes an electrochemical system.

Embodiment 33

The set of window assemblies or the method of any one of Embodiments 25 to 32, wherein the electrochemical system includes an electrochromic device.

Embodiment 34

The set of window assemblies or the method of any one of Embodiments 7 to 10 and 17 to 33, wherein:
the first, second, and the third dimensions are different from one another; and
the third length of the third solar panel and the first length of the first solar panel are different from each other.

Embodiment 35

The set of window assemblies or the method of any one of Embodiments 22 to 34, wherein the third solar panel has a third width, and the third width of the third solar panel is the same as the first width of the first solar panel, the second width of the second solar panel, or both.

Embodiment 36

The set of window assemblies or the method of any one of Embodiments 22 to 30, wherein the third solar panel has a third width, and the third width of the third solar panel is different from the first width of the first solar panel, the second width of the second solar panel, or both.

Embodiment 37

The set of window assemblies or the method of any one of Embodiments 8 to 10 and 18 to 36, wherein the third length of the third energy storage unit is the same as the first length of the first energy storage unit, the second length of the second energy storage unit, or both.

Embodiment 38

The set of window assemblies or the method of any one of Embodiments 8 to 10 and 18 to 36, wherein the third length of the third energy storage unit is different from the first length of the first energy storage unit, the second length of the second energy storage unit, or both.

Embodiment 39

The set of window assemblies or the method of any one of Embodiments 37 or 38, wherein the third energy storage unit has a third width, and the third width of the third energy storage unit is the same as the first width of the first energy storage unit, the second width of the second energy storage unit, or both.

Embodiment 40

The set of window assemblies or the method of any one of Embodiments 37 or 38, wherein the third energy storage unit has a third width, and the third width of the third energy storage unit is different from the first width of the first energy storage unit, the second width of the second energy storage unit, or both.

Embodiment 41

The set of window assemblies or the method of any one of Embodiments 9, 10, and 19 to 40, wherein the third length of the third trim panel is the same as the first length of the first trim panel, the second length of the second trim panel, or both.

Embodiment 42

The set of window assemblies or the method of any one of Embodiments 9, 10, and 19 to 40, wherein the third length of the third trim panel is different from the first length of the first trim panel, the second length of the second trim panel, or both.

Embodiment 43

The set of window assemblies or the method of any one of Embodiments 9, 10, and 19 to 42, wherein the third trim panel has a third width that is the same as the first length of the first trim panel, the second length of the second trim panel, or both.

Embodiment 44

The set of window assemblies or the method of any one of Embodiments 9, 10, and 19 to 42, wherein the third trim panel has a third width that is different from the first length of the first trim panel, the second length of the second trim panel, or both.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A set of window assemblies comprising:
   a first window assembly including:
      a first glass unit having a first dimension along a first edge;
      a first solar panel adjacent to and extending along the first edge of the first glass unit, wherein the first solar panel has a first length, wherein the first solar panel is attached to a major face of the first glass unit, and wherein a portion of the major face of the first glass unit is covered by the first solar panel; and
      a first plurality of trim panels adjacent to and extending along the first edge of the first glass unit, wherein the first plurality of trim panels are attached to the major surface of the first glass unit and aligned with the first solar panel in a direction of the first length of the solar panel,
      wherein the first window assembly is installed within a first frame, and wherein the first solar panel is disposed between two trim panels of the first plurality of trim panels such that lateral spaces between sides of the first frame and edges, of the first solar panels are covered by the two trim panels; and
   a second window assembly including:
      a second glass unit having a second dimension along a second edge; and
      a second solar panel adjacent to and extending along the second edge of the second glass unit, wherein the second solar panel has a second length; and
      a second trim panel adjacent to and extending along the second edge of the second glass unit, wherein the second trim is attached to a major surface of the second glass unit; wherein the second window assembly is installed within a second frame, and wherein the second trim panel is disposed such that a lateral space between a side of the second frame and an edge of the second solar panel is covered by the second trim panel,
   wherein:
      the first and second dimensions are different from each other, and the first and second lengths are the same; and
      a first width of the first solar panel is the same as a width of the two trim panels of the first plurality of trim panels, or a second width of the second solar panel is the same as a width of the second trim panel.

2. The set of window assemblies of claim 1, wherein:
   the first glass unit is a first insulated glass unit including glazing sheets spaced apart from one another, and the major face of the first glass unit is an exterior major face of the first insulated glass unit; and
   the second glass unit is a second insulated glazing unit including glazing sheets spaced apart from one another.

3. The set of window assemblies of claim 1, further comprising a third window assembly including a third glass unit having a third dimension along a third edge, wherein the third window assembly further comprises:
   a third solar panel adjacent to and along the third edge of the third glass unit, wherein the third solar panel has a third length;
   a third energy storage unit adjacent to and along the third edge of the third glass unit, wherein the third energy storage unit has a third length;
   a third trim panel adjacent to and along the third edge of the third glass unit, wherein the third trim panel has a third length;
   a third control unit electrically coupled to a third solar panel or a third energy storage unit; or
   any combination thereof.

4. The set of window assemblies of claim 2, wherein the first window assembly is installed within a first frame; and wherein the second window assembly is installed within a second frame.

5. The set of window assemblies of claim 1, wherein the first solar panel has a first width, the second solar panel has a second width, and the first width of the first solar panel and the second width of the second solar panel are different from each other.

6. The set of window assemblies of claim 3, wherein:
   the first, second, and the third dimensions are different from one another; and
   the third length of the third solar panel and the first length of the first solar panel are different from each other.

7. The set of window assemblies of claim 1, wherein:
   the first window assembly further comprises:
      a first energy storage unit and a first control unit electrically coupled to the first solar panel or the first energy storage unit; and
   the second window assembly further comprises:
      a second energy storage unit and a second control unit electrically coupled to the second solar panel or the second energy storage unit.

8. The set of window assemblies of claim 1, wherein the first width of the first solar panel and the second width of the second solar panel are the same.

9. The set of window assemblies of claim 1, wherein the first width of the first solar panel and the second width of the second solar panel are different from each other.

10. The set of window assemblies of claim 7, further comprising a third window assembly including a third glass unit having a third dimension along a third edge, wherein the third window assembly further comprises:
   a third solar panel adjacent to and along the third edge of the third glass unit, wherein the third solar panel has a third length;
   a third energy storage unit adjacent to and along the third edge of the third glass unit, wherein the third energy storage unit has a third length;
   a third trim panel adjacent to and along the third edge of the third glass unit, wherein the third trim panel has a third length;
   a third control unit electrically coupled to a third solar panel or a third energy storage unit; or
   any combination thereof.

11. A set of window assemblies, comprising:
a first window assembly installed within a first frame, wherein the first window assembly comprises:
- a first glass unit having a first dimension along a first edge, wherein the first glass unit is a first insulated glass unit including glazing sheets;
- a first solar panel adjacent to and centered along the first edge of the first glass unit, wherein the first solar panel has a first length extending along the first edge, wherein the first solar panel is attached to an exterior major surface of the first window assembly and wherein a portion of the exterior major surface of the first window assembly is covered by the first solar panel; and
- a first plurality of trim panels attached to the exterior major surface of the first window assembly, wherein the plurality of trim panels are adjacent to and each has a length extending along the first edge of the first glass unit, wherein the first solar panel is aligned with and disposed between two trim panels of the plurality of trim panels;

a second window assembly installed within a second frame, wherein the second window assembly comprises:
- a second glass unit having a second dimension along a second edge; and
- a second solar panel adjacent to and having a second length extending along the second edge of the second glass unit, wherein the second solar panel is attached to an exterior major surface of the second window assembly and a portion of the exterior major surface of the second window assembly is covered by the second solar panel, wherein the first and second dimensions are different from each other, and the first and second lengths are the same.

12. The set of window assemblies of claim 11, wherein:
the second window assembly further comprises a plurality of trim panels attached to the exterior major surface of the second window assembly, wherein the plurality of trim panels are adjacent to and each has a length extending along the second edge of the first glass unit, wherein the second solar panel is disposed between two trim panels of the plurality of trim panels.

13. A method comprising:
selecting a first solar panel having a first length;
installing the first solar panel adjacent to a first edge of a first glass unit, wherein the first glass unit has a first dimension along a first edge, and wherein the first solar panel is attached to a major surface of the first glass unit and a portion of the major surface of the first glass unit is covered by the first solar panel;
selecting a first plurality of trim panels having a first length;
installing the first plurality of trim panels adjacent to the first edge of the first glass unit, wherein the first plurality of panels are attached to the major surface of the first glass unit, the first solar panel is disposed between and aligned with two of the first plurality of trim panels;
selecting a second solar panel having a second length;
installing the second solar panel adjacent to a second edge of a second glass unit, wherein the second glass unit has a second dimension along a second edge, and wherein the second solar panel is attached to a major surface of the second glass unit;
selecting a second trim panel having a second length; and
installing the second trim panel adjacent to the second edge of the second glass unit, wherein the second trim panel is attached to the major surface of the second glass unit,
wherein the first and second dimensions are different from each other, and the first and second lengths are the same; and
wherein a first width of the first solar panel is the same as a width of the first trim panel, or a second width of the second solar panel is the same as a width of the second trim panel.

14. The method of claim 13, wherein the first length of the first trim panel and the second length of the second trim panel are different from each other.

15. The method of claim 13, further comprising:
installing a first control unit electrically coupled to the first solar panel, the first energy storage unit, or both; and
installing a second control unit electrically coupled to the second solar panel, the second energy storage unit, or both.

16. The method of claim 13, further comprising:
determining a first energy rating of the first window assembly, wherein selecting the first solar panel or the first energy storage unit depends at least in part on the first energy rating;
determining a second energy rating of the second window assembly, wherein selecting the second solar panel or the second energy storage unit depends at least in part on the second energy rating; or
determining the first energy rating of the first window assembly and the second energy rating of the second window assembly, wherein selecting the first solar panel or the first energy storage unit depends at least in part on the first energy rating, and selecting the second solar panel or the second energy storage unit depends at least in part on the second energy rating.

17. The method of claim 13, wherein the first solar panel has a first width, the second solar panel has a second width, and the first width of the first solar panel and the second width of the second solar panel are the same.

18. The method of claim 13, wherein the first solar panel has a first width, the second solar panel has a second width, and the first width of the first solar panel and the second width of the second solar panel are different from each other.

19. The method of claim 18, wherein:
the first, second, and the third dimensions are different from one another; and
the third length of the third solar panel and the first length of the first solar panel are different from each other.

20. The method of claim 13, wherein a width of the first solar panel is the same as the width of a first trim panel, or a width of the second solar panel is the same as the width of a second trim panel.

* * * * *

UNITED STATES PATENT AND TRADEMARK OFFICE
CERTIFICATE OF CORRECTION

| | |
|---|---|
| PATENT NO. | : 10,666,189 B2 |
| APPLICATION NO. | : 14/986888 |
| DATED | : May 26, 2020 |
| INVENTOR(S) | : Bryan D. Greer et al. |

It is certified that error appears in the above-identified patent and that said Letters Patent is hereby corrected as shown below:

In the Claims

Column 15, Line 42, Claim 1 delete "and edges, of", and insert --and edges of--

Column 17, Line 57, Claim 13 delete "plurality of panels are", and insert --plurality of trim panels are--

Signed and Sealed this
Fourteenth Day of June, 2022

Katherine Kelly Vidal
*Director of the United States Patent and Trademark Office*